US011269851B2

(12) United States Patent
Sajja et al.

(10) Patent No.: US 11,269,851 B2
(45) Date of Patent: Mar. 8, 2022

(54) INDOOR SURVEY DATA COLLECTION

(71) Applicant: International Business Machines Corporation, Armonk, NY (US)

(72) Inventors: Surya Shravan Kumar Sajja, Bangalore (IN); Ashok Pon Kumar Sree Prakash, Bangalore (IN); Amith Singhee, Bangalore (IN); Satyam Dwivedi, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 16/402,450

(22) Filed: May 3, 2019

(65) Prior Publication Data

US 2020/0349145 A1 Nov. 5, 2020

(51) Int. Cl.
*G06F 16/23* (2019.01)
*G06N 20/00* (2019.01)

(52) U.S. Cl.
CPC ......... *G06F 16/2365* (2019.01); *G06N 20/00* (2019.01)

(58) Field of Classification Search
CPC ............... G06F 16/2365; G06F 16/906; G06F 16/9537; G06N 20/00; G06N 20/10
See application file for complete search history.

(56) References Cited

U.S. PATENT DOCUMENTS

| 9,635,516 | B1 | 4/2017 | Gu et al. |
| 10,111,197 | B2 | 10/2018 | Ronen |
| 2010/0265093 | A1 | 10/2010 | Cho et al. |
| 2012/0149415 | A1* | 6/2012 | Valaee ................... G01S 5/0252 455/507 |
| 2014/0316738 | A1* | 10/2014 | Kim ........................ G01S 17/08 702/150 |
| 2016/0094951 | A1 | 3/2016 | Yang et al. |
| 2018/0007654 | A1 | 1/2018 | Wirola et al. |
| 2018/0121571 | A1* | 5/2018 | Tiwari .................... G06F 30/13 |
| 2020/0088834 | A1* | 3/2020 | Ivanov .................. G01S 5/0252 |
| 2020/0304378 | A1* | 9/2020 | Choi ..................... H04L 41/145 |

FOREIGN PATENT DOCUMENTS

| CN | 103582119 A | 2/2014 |
| CN | 105338498 A | 2/2016 |
| CN | 106714110 A | 5/2017 |
| EP | 3144693 A1 | 3/2017 |

OTHER PUBLICATIONS

Fleischner, Herbert, "Eulerian Graphs and Related Topics: Annals of Discrete Mathematics 45", Part1, vol. 1, Elsevier, 1990.

(Continued)

*Primary Examiner* — Cam Y T Truong
(74) *Attorney, Agent, or Firm* — Sonny Z. Zhan

(57) ABSTRACT

In an approach for an indoor survey data collection, a processor generates reference points based on a site map and an accuracy requirement. A processor collects data at each reference point through a data collecting agent. A processor detects an outlier at the reference points using a feedback from the data collecting agent during the data collection and a database. A processor eliminates the detected outlier and rectifies the data.

11 Claims, 7 Drawing Sheets

(56) References Cited

OTHER PUBLICATIONS

Lee et al., "Voronoi Tessellation Based Interpolation Method for Wi-Fi Radio Map Construction", IEEE Communication Letters, vol. 16, No. 3, Mar. 2012, pp. 404-407.

Chen et al., "An Improved Algorithm to Generate a Wi-Fi Fingerprint Database for Indoor Positioning", Sensors, 12 pages, <www.mdpi.com/journal/sensors>.

Lemic et al., "Enriched Training Database for Improving the WiFi RSSI-based Indoor Fingerprinting Performance", 2016 13th IEEE Annual Consumer Communications & Networking Conference (CCNC), Jan. 6-13, 2016, Las Vegas, Nevada.

Khalajmehrabadi et al., "A Joint Indoor WLAN Localization and Outlier Detection Scheme Using LASSO and Elastic-Net Optimization Techniques", IEEE Transactions On Mobile Computing, vol. 16, No. 8, Aug. 2017, pp. 2079-2092.

Anzai et al., "A Simple Outlier Data Rejection Algorithm for An RSSI-based ML Location Estimation in Wireless Sensor Networks", 2008 IEEE 68th Vehicular Technology Conference, Sep. 21-24, 2008, Calgary Canada.

Guo et al., "Parallel Thinning with Two-Subiteration Algorithms", Communications of the ACM Magazine, vol. 32, Issue 3, Mar. 1989, pp. 359-373.

Zhang et al., "Ensuring high sensor data quality through use of online outlier detection techniques", International Journal of Sensor Networks, vol. 7, No. 3, May 2010, pp. 141-151.

Rath et al., "Realistic indoor path loss modeling for regular WiFi operations in India", 2017 Twenty-third National Conference on Communications (NCC), Mar. 2-4, 2017, Chennai, India, pp. 1-6.

Koweerawong et al., "Indoor Localization Improvement via Adaptive RSS Fingerprinting Database", The International Conference on Information Networking 2013 (ICOIN 2013), Jan. 27-30, 2013, Bangkok, Thailand, pp. 412-416.

Jan et al., "Received Signal Strength Database Interpolation by Kriging for a Wi-Fi Indoor Positioning System", Sensors 2015, 15, ISSN 1424-8220, <www.mdpi.com/journal/sensors>.

Tuta et al., "A Self-Adaptive Model-Based Wi-Fi Indoor Localization Method", Sensors 2016, 16, 2074; doi: 10.3390/s16122074, 22 pages, <www.mdpi.com/journal/sensors>.

Du et al., "A Novel Method for Constructing a WIFI Positioning System with Efficient Manpower", Sensors (Basel). Apr. 2015; 15(4): 8358-8381, Published online Apr. 10, 2015. doi: 10.3390/s150408358, 24 pages, <www.mdpi.com/journal/sensors>.

Caso et al., "On the applicability of multi-wall multi-floor propagation models to wifi fingerprinting indoor positioning." Future Access Enablers of Ubiquitous and Intelligent Infrastructures, First International Conference, FABULOUS 2015, Ohrid, Republic of Macedonia, Sep. 23-25, 2015, 7 pages.

Koo et al., "Localizing WiFi access points using signal strength." IEEE Communications Letters, vol. 15, No. 2, Feb. 2011, pp. 187-189.

Zhang et al, "An online outlier detection technique for wireless sensor networks using unsupervised quarter-sphere support vector machine." 2008 International Conference on Intelligent Sensors, Sensors Networks and Information Processing, Dec. 15-18, 2008, Sydney, Australia, 6 pages.

Oktavia et al., "Inverse distance weighting and kriging spatial interpolation for data center thermal monitoring." 2016 1st International Conference on Information Technology, Information Systems and Electrical Engineering (ICITISEE), Aug. 23-24, 2016, Yogyakarta, Indonesia, pp. 69-74.

"Temperature mapping of storage areas", Technical supplement to WHO Technical Report Series, No. 961, 2011 Annex 9: Model guidance for the storage and transport of time and temperature-sensitive pharmaceutical products, Jan. 2014, 25 pages.

"Hierholzer's Algorithm for directed graph", Geeks for Geeks A computer science portal for geeks, Printed Apr. 23, 2019, <https://www.geeksforgeeks.org/hierholzers-algorithm-directed-graph/>.

* cited by examiner

| (Country, City, Site, Building, Floor) | Time stamp | Position | Position Label | |
|---|---|---|---|---|
| India, Bengaluru, Manyata, G2, 8F | $t_1$ | $(X_1, Y_1)$ | 1 | $\{RSS_1^{AP1}, RSS_1^{AP2}, RSS_1^{AP3}, \ldots, RSS_1^{APm}\}$ |
| India, Bengaluru, Manyata, G2, 8F | ... | $(X_1, Y_1)$ | 1 | $\{RSS_1^{AP1}, RSS_1^{AP2}, RSS_1^{AP3}, \ldots, RSS_1^{APm}\}_1$ |
| India, Bengaluru, Manyata, G2, 8F | $t_p$ | $(X_1, Y_1)$ | 1 | $\{RSS_1^{AP1}, RSS_1^{AP2}, RSS_1^{AP3}, \ldots, RSS_1^{APm}\}_p$ |
| India, Bengaluru, Manyata, G2, 8F | $t_{p+1}$ | ... | walking | $\{RSS_{12}^{AP1}, RSS_{12}^{AP2}, RSS_{12}^{AP3}, \ldots, RSS_{12}^{APm}\}_{walk}$ |
| India, Bengaluru, Manyata, G2, 8F | ... | ... | walking | |
| India, Bengaluru, Manyata, G2, 8F | ... | ... | walking | $\{RSS_{12}^{AP1}, RSS_{12}^{AP2}, RSS_{12}^{AP3}, \ldots, RSS_{12}^{APm}\}_{walk}$ |
| India, Bengaluru, Manyata, G2, 8F | ... | $(X_2, Y_2)$ | 2 | $\{RSS_2^{AP1}, RSS_2^{AP2}, RSS_2^{AP3}, \ldots, RSS_2^{APm}\}_1$ |
| India, Bengaluru, Manyata, G2, 8F | ... | $(X_2, Y_2)$ | 2 | ... |
| India, Bengaluru, Manyata, G2, 8F | ... | $(X_2, Y_2)$ | 2 | $\{RSS_2^{AP1}, RSS_2^{AP2}, RSS_2^{AP3}, \ldots, RSS_2^{APm}\}_p$ |

FIG. 5

INDOOR SURVEY DATA COLLECTION

BACKGROUND

The present invention relates generally to the field of data collection, and more particularly to indoor survey data collection for an indoor localization system.

Indoor spaces, storage areas, data centers, and office spaces are usually instrumented with edge devices, actuators, sensors, and other sensory devices. A data collection survey of the area of interest is required for localizing existing edge devices, actuators, and sensors and optimizing placement of new ones.

SUMMARY

Aspects of an embodiment of the present invention disclose an approach for collecting indoor survey data. A processor generates reference points based on a site map and an accuracy requirement. A processor collects data at each reference point through a data collecting agent. A processor detects an outlier at the reference points using a feedback from the data collecting agent during the data collection and a database. A processor eliminates the detected outlier and rectifies the data.

BRIEF DESCRIPTION OF THE DRAWINGS

FIG. 5 illustrates a data format example for a data collection program, included in the computing device of FIG. 1, in accordance with an embodiment of the present invention.

DETAILED DESCRIPTION

The present invention is directed to systems and methods for enhancing quality of survey data for an indoor localization system. An indoor localization system is a system used to locate objects or people inside a building using Wi-Fi, lights, radio waves, magnetic fields, acoustic signals, or other sensory information. Indoor spaces, storage areas, data centers, and office spaces are usually instrumented with edge devices, actuators, sensors, and other sensory devices. A data collection survey of the area of interest is required for localizing existing edge devices, actuators, and sensors and for optimizing placement of new ones. This data may correspond to physical signals like Wi-Fi signals, temperatures, humidity, pressure, radiation etc. The data may be used as input for machine learning methods and optimization routines.

Embodiments of the present invention recognize that accuracy of data collected through survey is plagued by human errors. Human errors arise out of individuals not following the assigned survey protocol, not being technically literate to handle data collection software and maps, and or not being able to handle contingencies like changed floor plans, new obstacles or new equipment. These issues can be partially solved through high-skilled individuals. However, those errors are also prone-make errors in navigating an unfamiliar location, which is usually the case. Also, highly skilled individuals are expensive for a large-scale data collection for multiple sites. Embodiments of the present invention enhance the data accuracy in an online fashion while collecting the data.

Figure 1:
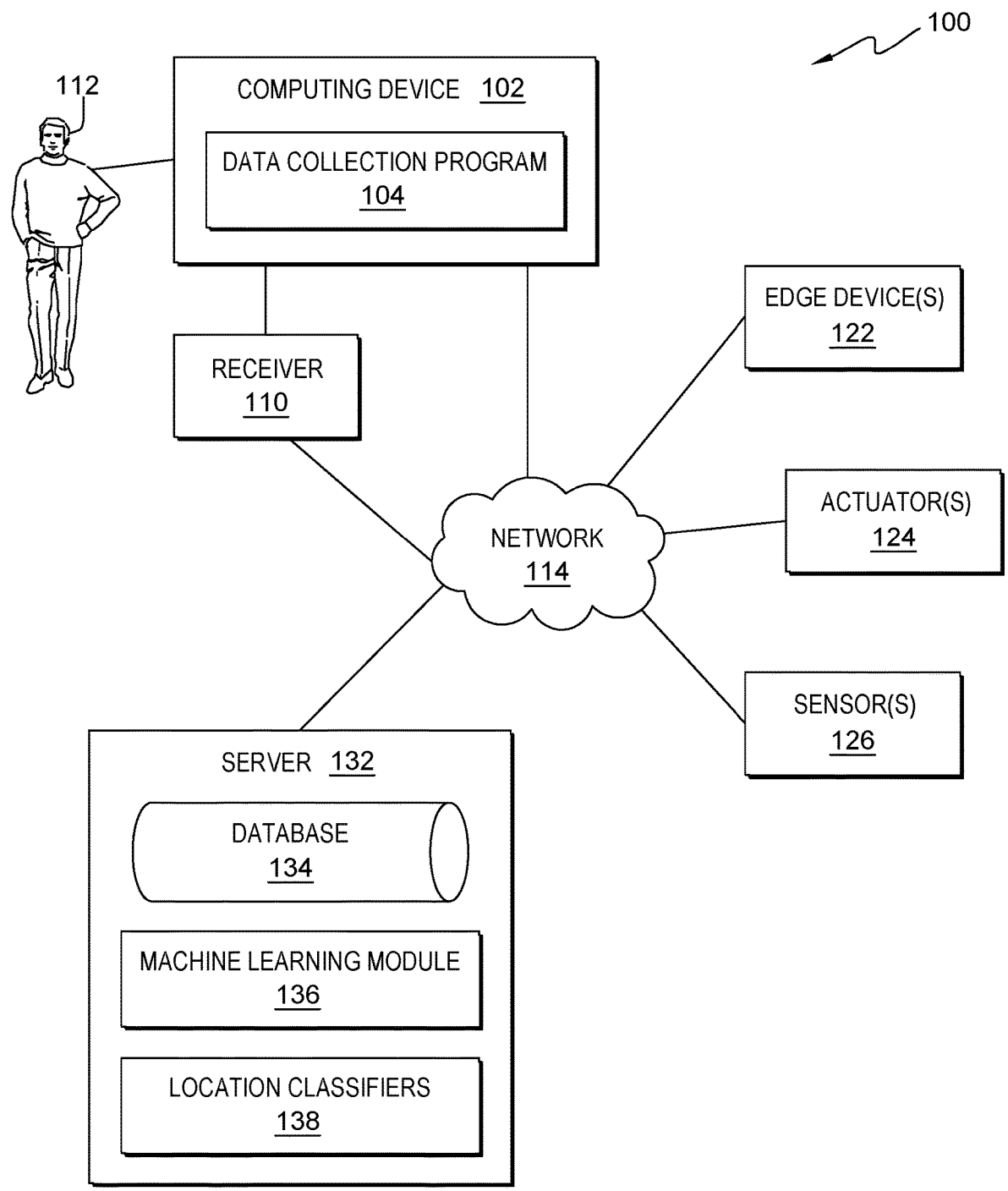
FIG. 1 is a functional block diagram illustrating a data collection environment having a computing device for data collection, in accordance with an embodiment of the present invention.

The present invention will now be described in detail with reference to the Figures. FIG. 1 is a functional block diagram illustrating a data collection environment, generally designated 100, in accordance with one embodiment of the present invention.

Data collection environment 100 includes a computing device 102, a server 132, and a network 114. Data collection environment 100 also includes edge devices 122, actuators 124, sensors 126, and other sensory devices (not shown) that may generate any physical signals. A data collecting agent 112 collects data using the computing device 102. The data collecting agent 112 can be a person, a robot, or any other suitable subject which can use the computing device 102. The data corresponds to physical signals like Wi-Fi signals, temperatures, humidity, pressure, radiation etc. Data collection environment 100 further includes a receiver 110 that receives signals and data from edge devices 122, actuators 124, sensors 126, and other sensory devices. The receiver 110 can be any suitable instrument configured to able to receive signals and data delivered from edge devices 122, actuators 124, sensors 126, and other types of sensory devices. The receiver 110 is configured to communicate signals and data to the computing device 102. In an embodiment, the receiver 110 is located externally and accessed through a communication network such as network 140. In another embodiment, the receiver 110 is integrated in the computing device 102.

In various embodiments of the present invention, the computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, the computing device 102 represents a computing system utilizing clustered computers and components to act as a single pool of seamless resources. In general, the computing device 102 can be any computing device or a combination of devices with access to data collection program 104 and network 114 and is capable of processing program instructions and executing data collection program 104, in accordance with an embodiment of the present invention. The computing device 102 may include internal and external hardware components, as depicted and described in further detail with respect to FIG. 7.

Further, in the depicted embodiment, the computing device 102 includes a data collection program 104. In the depicted embodiment, the data collection program 104 is located on computing device 102. However, in other embodiments, the data collection program 104 may be located externally and accessed through a communication network such as network 140. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between the computing device 102 and the data collection program 104, in accordance with a desired embodiment of the invention.

Server 132 may be a management server, a web server, or any other electronic device or computing system capable of processing program instructions and receiving and sending data. In some embodiments, server 132 may be a laptop computer, a tablet computer, a netbook computer, a personal computer (PC), a desktop computer, or any programmable electronic device. In other embodiments, server 132 may represent a server computing system utilizing multiple computers as a server system, such as in a cloud computing environment. In another embodiment, server 132 represents a computing system utilizing clustered computers and components to act as a single pool of seamless resources.

Server 132 contains database 134, machine learning module 136, and location classifiers 138. In an embodiment, database 134 is a Wi-Fi fingerprint database for Wi-Fi positioning system. In another embodiment, database 134 is a temperature mapping database or any other database that provides data for machine learning module 136. Location classifiers 138 are configured to classify locations in an area to be surveyed based on information and data in database 134 and using machine learning methods performed by the machine learning module 136. Server 132 may include internal and external hardware components, as depicted and described in further detail with respect to FIG. 7.

Edge devices 122 are devices which provide an entry point into enterprise or service provider core networks. Examples include routers, routing switches, integrated access devices, multiplexers, and a variety of metropolitan area network and wide area network access devices. Actuators 124 are a mechanism for turning energy into motion. Actuators 124 can, for example, be pneumatic actuators, hydraulic actuators, electric actuators, and thermal actuators. Sensors 126 are devices that detect and respond to some type of input from the physical environment. The specific input could be light, heat, motion, moisture, pressure, or any one of a great number of other environmental phenomena. The output is generally a signal that is converted to human-readable display at the sensor location or transmitted electronically over a network for reading or further processing. For example, sensors 126 can be temperature sensors, oxygen sensors, motion sensors, and photo sensors.

In one embodiment, data collection environment 100 is a Wi-Fi-based positioning system. Wi-Fi positioning system is a geolocation system that uses the characteristics of nearby Wi-Fi hotspots and other wireless access points to discover where a device is located. The localization technique used for positioning with wireless access points is based on measuring received signal strength (RSS) and fingerprinting methods. Typical parameters useful to geolocate a Wi-Fi hotspot or wireless access point include a service set identifier (SSID) and a media access control (MAC) address of the access point. The accuracy depends on the number of positions that have been entered into the database. An example Wi-Fi fingerprint data format for data collection program 104 is illustrated in FIG. 5, in accordance with an embodiment of the present invention.

Figure 2:
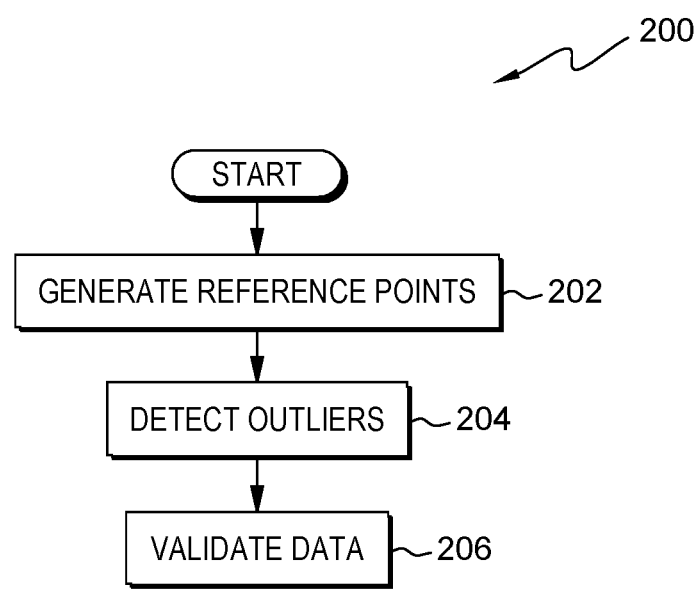
FIG. 2 is a flowchart depicting operational steps of a data collection program, included in the computing device of FIG. 1, in accordance with an embodiment of the present invention.

FIG. 2 is a flowchart 200 depicting operational steps of data collection program 104 for automating indoor survey data collection process to improve survey data quality and accuracy, in accordance with an embodiment of the present invention.

In step 202 data collection program 104 automatically generates reference points based on a site map, and a requirement to achieve the required levels of data survey accuracy for the site of interest. Reference points are locations on a site map to indicate data collection points. Reference points are locations for a data collecting agent 112 to collect data at. A site map can be a file in a format such as pdf, jpeg, png or another suitable file format as an input to data collection program 104. Another input for data collection program 104 is a minimum distance between two consecutive reference points. The minimum distance is based on the accuracy requirement. The minimum distance can be fixed a priori, or the minimum distance can be calibrated during the data collection. In one embodiment, given a site map, a traversable path is found through an image thinning process. Every pixel on the traversable path is a node of a graph which is a graph representation of the traversable path. Data collection program 104 finds a set of vertices in a largest connected subgraph which is to be traveled and generates a multiple out of this graph for duplicating edges. Data collection program 104 is configured to instruct data collecting agent 112 to cover accessible locations of a floor. Data collection program 104 begins with a starting point on the graph, generates a Eulerian tour, and ends the tour almost near the starting point. In one example, data collection program 104 uses Hierholzer's algorithm. Based on the minimum distance between two consecutive points of the tour, reference points are spaced on the tour and their corresponding (x, y) coordinates are stored. The minimum distance can be fixed a priori based on time constraints. In another embodiment, the minimum distance between reference points can be calibrated during the data collection process.

Data collection program 104 collects data at each reference point through data collecting agent 112. Data collection program 104 may re-calibrate the reference points based on data that the data collecting agent 112 collects. Data collection program 104 may perform a re-survey of a problematic reference point and adaptively change the minimum distance between the reference points.

In step 204 data collection program 104 detects an outlier at each reference point, eliminates the detected outliers, and rectifies the collected data using feedback from the data collecting agent 112 about obstacles and other site relative information. Obstacles, for example, may be floors, meeting rooms, walls, stairs, wings, cubicles, tables, support pillars, and any other subjects that may prevent data collecting agent 112 from accessing a location and collecting data. Data collection program 104 uses historical data from machine learning methods, through machine learning module 136, based on data collection processes and the nature of signals received, for example, from edge devices 122, actuators 124, sensors 126, and other example sensory devices as described in FIG. 1. Data collection program 104 identifies and rectifies an erroneous action of the data collecting agent 112 by using data characteristics and feedback from the data collecting agent 112. The erroneous action from the data collecting agent 112, for example, may include: not following the assigned survey protocol, not being technically literate to use the computing device 104 or the site map, and or not being able to handle contingencies such as a changed floor map, a new obstacle or a new equipment. An outlier is an observation point that is distant from other observations. An outlier may be due to variability in the measurement or be an experimental error. Once the site map with reference points is ready, the data collecting agent 112 using the computing device 102 stands on each reference point and may, for example, slowly rotate while collecting data. Data collection program 104 has several built-in protections to maintain quality of data. At each reference point the data collecting agent 112 stops and may, for example, slowly rotate until p data points are collected. Parameter p is fixed a priori. This approach circumvents the problems arising out of varying data collection devices. In the data collection process, after covering the second reference point, data collection program 104 starts performing the outlier detection using a normal model of data. This normal model of the data is learned incrementally using a machine learning based method.

In one embodiment, data collection program 104 uses one-class quarter-sphere support vector machine (SVM) to build the normal model of received signal strength indicator (RSSI) measurements. The RSSI data vectors for two access points at the reference point can be used for classification using one class quarter sphere SVM. The distance of marginal support vectors to the origin indicates the minimal radius R of the quarter-sphere and can be used to classify any new unseen data vector as normal or anomalous. Those data vectors whose distances to the origin are larger than R are detected as outliers.

In the embodiment above, given N known access points in a floor the fingerprint at reference point i at time t is:

$$\vec{RSS}_i(t)=\{RSS_i^1(t), RSS_i^2(t), \ldots, RSS_i^N(t)\}$$

One-class quarter-sphere SVM uses a kernel function k($\vec{RSS}_i$, $\vec{RSS}_j$)=$\phi(\vec{RSS}_i) \cdot \phi(\vec{RSS}_j)$ to compute the similarity of any of two vectors in the feature space. Distance of a vector $\vec{RSS}$ from the origin in the feature space can be formalized as:

$$d(\vec{RSS}) = \sqrt{\left\| \phi(\vec{RSS}) - \frac{1}{m}\sum_i^m \phi(\vec{RSS}_i) \right\|^2}$$

Data vector $\vec{RSS}$ is classified as normal if $d(\vec{RSS}) \leq R$, comparing $d(\vec{RSS})$ with median of the values of R from a window of previous measurement. If $d(\vec{RSS}) > R_m$, then $\vec{RSS}$ may be an outlier. Values of R from a previous reference point are used when performing outlier detection for the current reference point. The current reference point can be further used when the computing device 102 has parallel processing capability. Even if $d(\vec{RSS}) > R$ and $d(\vec{RSS}) > R_m$, a normal value may be obtained corresponding to a significantly different location. To prevent such false positives, a correlation test is used to confirm if $\vec{RSS}$ is indeed an outlier.

In an embodiment, an indoor path loss model is used for adjusting values of $\vec{RSS}$ based on the indoor path loss models. Adjusting values of $\vec{RSS}$ enables conversations between data collecting agent 112 and data collection program 104. At every reference point the data collection program 104 asks the data collecting agent 112 to provide the information about the obstacle between current and previous reference points. This information is used to adjust RSSI values based on path loss models or some empirically determined loss parameters from other floors.

In an embodiment, the path loss parameter $\Delta$ can be calculated if positions of access points and properties of obstacles in the floor are available a priori. The path loss can be characterized as a function of frequency of transmission due to: distance between transmitter and receiver; obstructions such as walls and partitions; and ceilings in multi-story buildings. If positions of access points are unavailable, then these losses can be empirically evaluated by performing a Wi-Fi fingerprint data survey. The outlier detection can function with $\Delta=0$.

In step 206 data collection program 104 validates data after the data collecting agent 112 completes collecting data from the reference points. In some embodiments, the following data validation tests are performed. Data collection program 104 determines if the reference points are covered by the data collecting agent 112. If any of the reference points is not covered, then those points are provided as an output to the data collecting agent for a second round of data collection. Data collection program 104 further collects data points between reference points in a second round of data collection. Once the reference points are covered, data collection program 104 randomly select, for example, 80% of the data samples that are used to train a location classifier with N classes. The remaining 20% of data samples can be used to verify model accuracy. If classification accuracy falls below a threshold $\alpha_1$, then data collection program 104 finds erroneous classifications from the confusion matrix and re-fingerprints those reference points. If classification accuracy falls below a threshold $\alpha_2 \ll \alpha_1$, then data collection program 104 re-fingerprints the floor.

Figure 3:
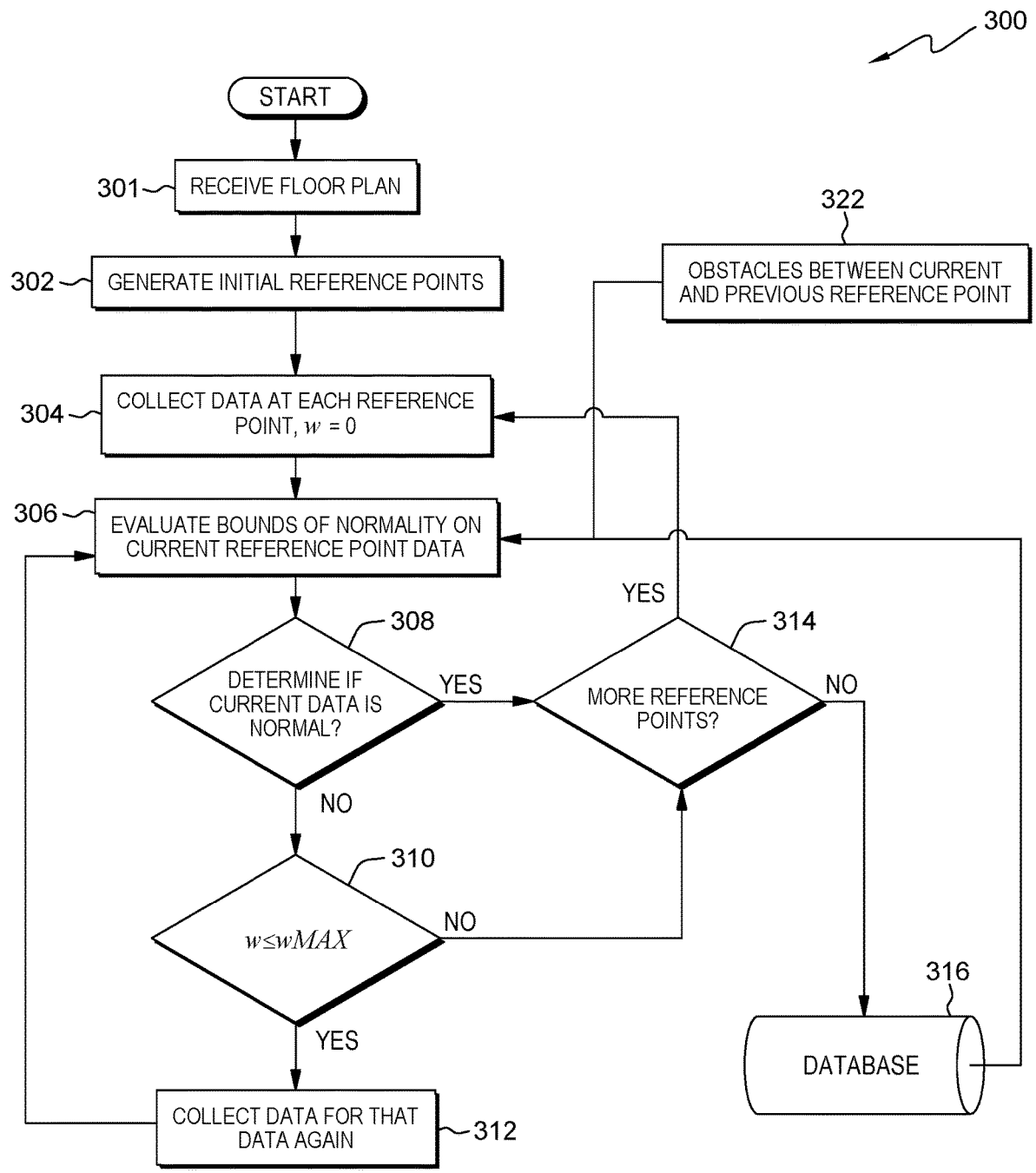
FIG. 3 illustrates operational steps of a data collection program, included in the computing device of FIG. 1, in accordance with an embodiment of the present invention.

FIG. 3 is a flowchart 300 depicting operational steps of data collection program 104 for automating indoor survey data collection process to improve survey data, in accordance with one embodiment of the present invention.

In step 301 data collection program 104 receives a floor plan for an area of interest for data collection. The floor plan may include a site map, granularity of prediction and an accuracy requirement. A site map can be a file format such as pdf, jpeg, png or other suitable file format types. Granularity of prediction includes floors, meeting rooms, wings, cubicles and other obstacles.

In step 302 data collection program 104 generates initial reference points based on a site map, granularity of prediction and an accuracy requirement. Accuracy and granularity determine the minimum distance between successive reference points. In step 304 data collection program 104 collects data through data collecting agent 112 using the computing device 102 for each reference point. In one embodiment, the data to be collected is Wi-Fi fingerprint data. In another embodiment, the data to be collected is temperature mapping data.

At each reference point the data collecting agent 112 stops and may, for example, slowly rotate until p data points are collected. Parameter p is fixed a priori. This approach circumvents the problems arising out of varying data collection devices. Data collection program 104 checks if the reference points are covered by the data collection agent 112 after the end of the survey. If any of the reference points are not covered, then those points are provided as an output to the data collection agent 112 for a second round of data collection. Data collection program 104 uses an image processing and global positioning system to verify whether relative positions of the reference points and obstacle information are correct and whether the data collecting agent 112 is in the correct building. This activity is performed during the outlier detection while conversing with the data collecting agent 112. Data collection program 104 predicts movement with an accelerometer to determine whether the data collecting agent 112 is moving.

In step 306 data collection program 104 evaluates bounds of normality on current reference point data based on previous reference points. At each reference point, data collection program 104 collects the data at the current reference point and predicts data samples for previous reference points. For example, if the data collecting agent 112 is at the reference point "i" then data collection program 104 has the data collected for the previous reference points, given by P={1, 2, 3, . . . , i}. Data collection program 104 predicts the value at a reference point, k ∈ P using the data from the reference points belonging to P-{k}. In one embodiment, data collection program 104 performs this prediction using a mathematical framework, which is based on using obstacle information and access point locations as inputs. Data collection program 104 receives obstacle information from the data collecting agent 112 and localizes access points using methods which are continuously calibrated based on predictions and real values. If this prediction is above a certain threshold then data collection program 104 adaptively reduces the minimum distance between the future reference points and generates a new reference point near the problematic reference point. If bad predictions around a reference point persist "ωMAX" times (decided a priori), then data collection program 104 determines no outlier but an extreme case. Data collection program 104 dynamically asks the data collecting agent 112 for feedback and information regarding obstacles between current and previous reference points as shown in 322. Data collecting agent 112 answers with the required relative information accordingly. In step 306, data collection program 104 uses both current reference point data and database 316 to evaluate bounds of normality on current reference point data based on previous reference points.

In step 308, data collection program 104 determines if data at current reference point is normal or the data passes a correlation test. If the data at current reference point is normal or the data passes a correlation test, data collection program 104 proceeds to step 314 to determine if additional reference points are left for data collection. In step 308, if data at current reference point is not normal nor does the data pass a correlation test, data collection program 104 repeats step 310 until one of the outlier detection loops terminates upon reaching ω=ωMAX. In step 312 data collection program 104 instructs data collecting agent 112 to go back to a point near the suspicious reference point and collect the data for that reference point again. In step 314, data collection program 104 determines whether data is required from more reference points. If there are no more reference points from which to collect data, data collection program 104 stores collected data into database 316. In one embodiment, data collection program 104 stores the collected data in a database in computing device 102. In another embodiment, data collection program 104 stores the collected data in a database in server 132.

Figure 4:
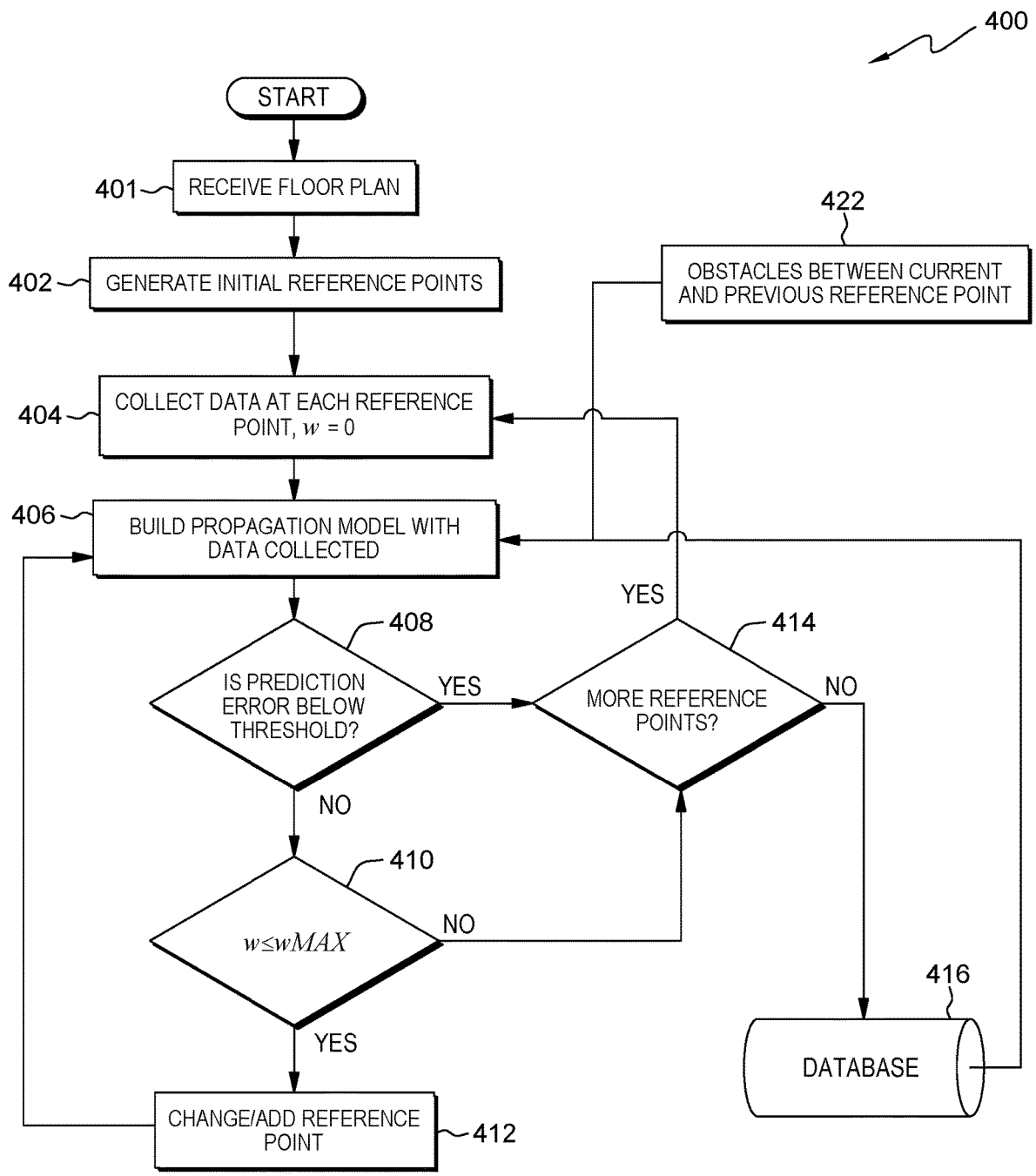
FIG. 4 illustrates operational steps of a data collection program, included in the computing device of FIG. 1, in accordance with an embodiment of the present invention.

FIG. 4 is a flowchart 400 depicting operational steps of data collection program 104 for automating indoor survey data collection process to improve survey data quality and accuracy, in accordance with one embodiment of the present invention. In one embodiment, operational steps in both flowcharts 300 and 400 can be executed in computing device 104 in parallel. In another embodiment, operational steps in both flowcharts 300 and 400 can be executed independently and separately in computing device 102.

In step 401 data collection program 104 receives a floor plan for an area of interest for data collection. The floor plan may include a site map, granularity of prediction and an accuracy requirement. A site map can be a file in a format such as pdf, jpeg, png or another suitable file format types. Granularity of prediction includes floors, meeting rooms, wings, cubicles and other obstacles.

In step 402 data collection program 104 generates initial reference points based on input of a site map, granularity of prediction and an accuracy requirement. Accuracy and granularity determine the minimum distance between successive reference points. In step 404 data collection program 104 collects data through data collecting agent 112 using the computing device 102 for each reference point. In one embodiment, the data is Wi-Fi fingerprint data. In another embodiment, the data is temperature data.

In step 406 data collection program 104 builds a propagation model with the data collected, calibrates the propagation model, and predicts data of previous reference points. Data collection program 104 obtains bounds on a normality testing of a data sample by calculating the maximum variance of the RSSI vectors at any given reference point. For example, if the data collecting agent is at reference point "i" and collects p data samples at i, let the maximum variance of the data collected at i be Ri. These values of maximum variance for the reference points already covered in the floor (and also the reference points covered in different floors and buildings) are stored and compared against Ri. If the variance at the current reference point "i" is higher than a predefined threshold compared to R values from other reference points, data collection program 104 detects a possible outlier. Such an outlier may be the result of the data collecting agent 112 disregarding prompts from the data collection program 104 and continuing to move despite the data collecting agent 112 being supposed to stay at the reference point. When data collection program 104 detects an outlier, data collection program 104 advises the data collecting agent 112 to cover a point near the problematic reference point. Data collection program 104 dynamically asks data collecting agent 112 for feedback and information regarding any obstacle between the current and previous reference point, as shown in 422. Data collecting agent 112 answers with the required relative information accordingly In step 408, if the prediction error of any of the covered reference points is below a threshold, data collection program 104 moves on to step 414 to determine if additional reference points are left for data collection. In step 408, if the prediction error of any of the covered reference points is not below a threshold, data collection program 104 repeats step 410 until one of the outlier detection loops terminates upon reaching ω=ωMAX. In step 412, data collection program 104 instructs the data collecting agent 112 to go back to a point near the suspicious reference point and collect the data for that reference point again. In step 414, data collection program 104 determines whether the data collecting agent 112 needs to collect data from additional reference points. If no more reference point data is required to be collected, data collection program 104 stores collected data into database 416. In one embodiment, data collection program 104 stores the collected data in a database in computing device 102. In another embodiment, data collection program 104 stores the collected data in a database in server 132.

In an embodiment, systematic temperature mapping is necessary for office rooms, data centers, freezer rooms, cold rooms, warehouses, packing areas, and other areas in which temperature sensitive products are stored, or are temporarily held. It may be beneficial for this exercise to be carried out for the warmest and coldest times of the year. Primary motivations/objectives of the temperature mapping may include assessing overall thermal stability of the space that is mapped with respect to acceptance criteria, identifying inconsistent temperature variations, extreme fluctuations, hot spots and cold spots caused by heating, ventilation, and air conditioning (HVAC) systems, and understanding factors that explain the observed temperature variations, for example, the location of the HVAC components and doors, glass windows, etc. In circumstances where a temperature monitoring system is not installed for routine monitoring, temperature mapping can be used for identifying the optimal locations for temperature sensor placement. If a monitoring system is already installed, the temperature mapping can be used for identifying the best location to re-locate a temperature sensor if necessary.

In one embodiment, a temperature mapping is applied and recognized in flowcharts and steps illustrated in FIGS. 2-4. Propagation models and obstacle information can be used for a temperature mapping by replacing propagation models with inverse distance weighted interpolation. Obstacle information can be replaced by information about heating and cooling components and doors. Inverse distance weighted interpolation method can be used to estimate temperature (or the humidity) $\hat{T}$ at an arbitrary point derived from the following expressions where n is the number of the measurement sensor nodes, $T_i$ at the $i^{th}$ reference point and $w_i$ is the weight coefficient of sensor i.

$$\hat{T} = \Sigma_{i=1}^{n} w_i T_i$$

Coefficient $w_i$ is given by $$w_i = \frac{d_i^{-r}}{\sum_{j=1}^{n} d_j^{-r}}$$

where $d_i$ is the distance between point of estimation and $i^{th}$ reference point and r is a positive real number.

FIG. 5 illustrates a data format example 500 for data collection program 104, in accordance with an embodiment of the present invention. Column 502 includes location information. For example, location information can include country, city, site, building and floor. Column 504 is time stamp when data collecting agent 112 collects data using computing device 102 having data collection program 104. Column 506 is position or called as reference point where data collecting agent 112 is located to collect data. Column 508 has information for each position label. Column 510 indicates received signal strength (RSS) information for each position that the data collecting agent 112 collects. In one embodiment, data format 500 is a Wi-Fi fingerprint data format. In another embodiment, data format 500 can be a temperature mapping data or other data configured to be collected and processed by data collection program 104.

Figure 6:
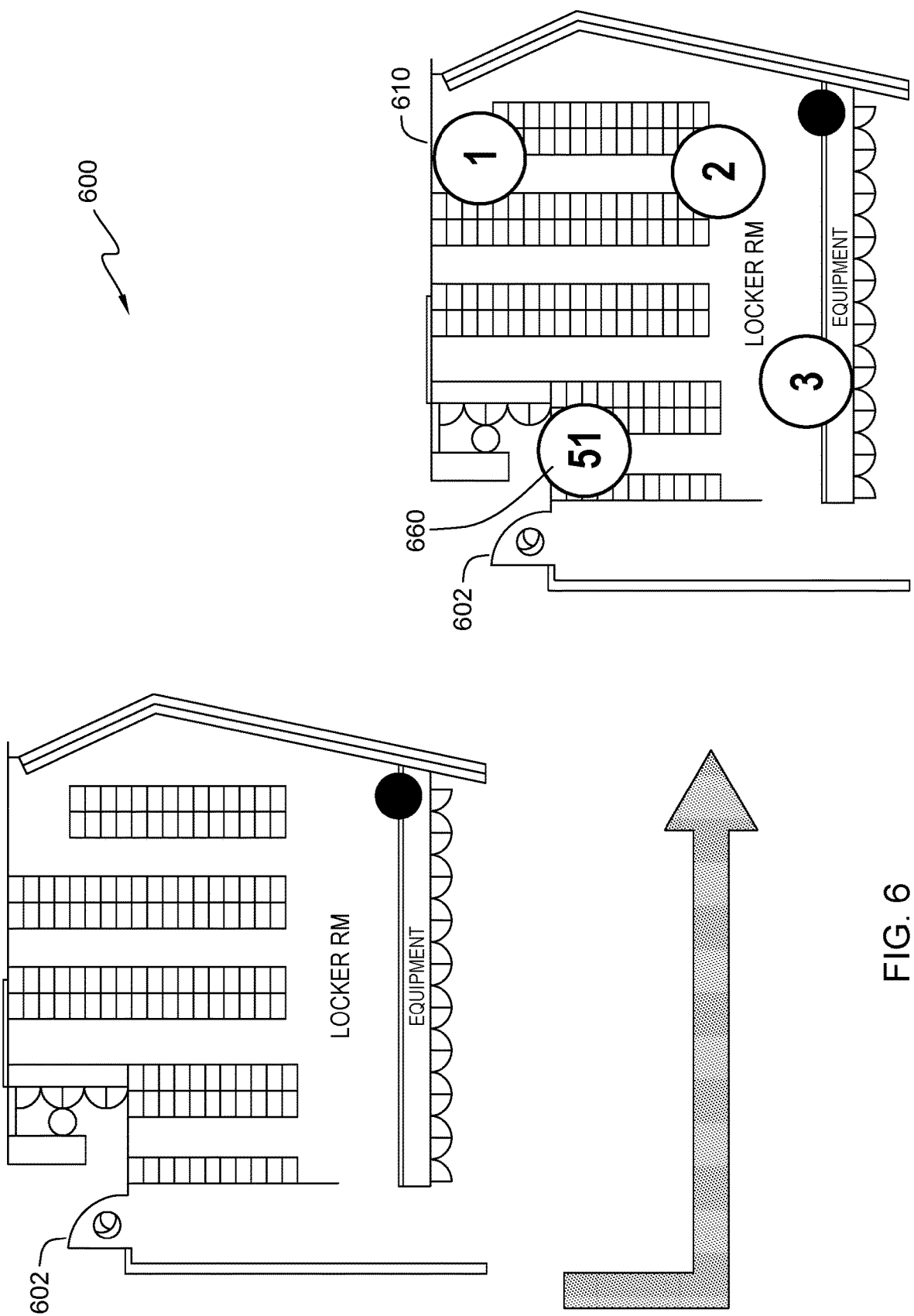
FIG. 6 illustrates an example office environment from which a data collection program, included in the computing device of FIG. 1, collects indoor survey data, in accordance with an embodiment of the present invention.

FIG. 6 illustrates an example office environment 600 that data collection program 104 collects indoor survey data, in accordance with an embodiment of the present invention. Data collection program 104 generates initial reference points numbered as 1 . . . 51 using input information of site map 602, granularity of prediction, and accuracy requirements. Reference points 1 . . . 51 are placed on a path on the site map while maintaining a minimum distance between them. Data collection program 104 begins with starting point 1 (610) on the graph and ends with the ending point 51 (660). More reference points between the starting point 1 and the ending point 51 are not shown in FIG. 6.

Figure 7:
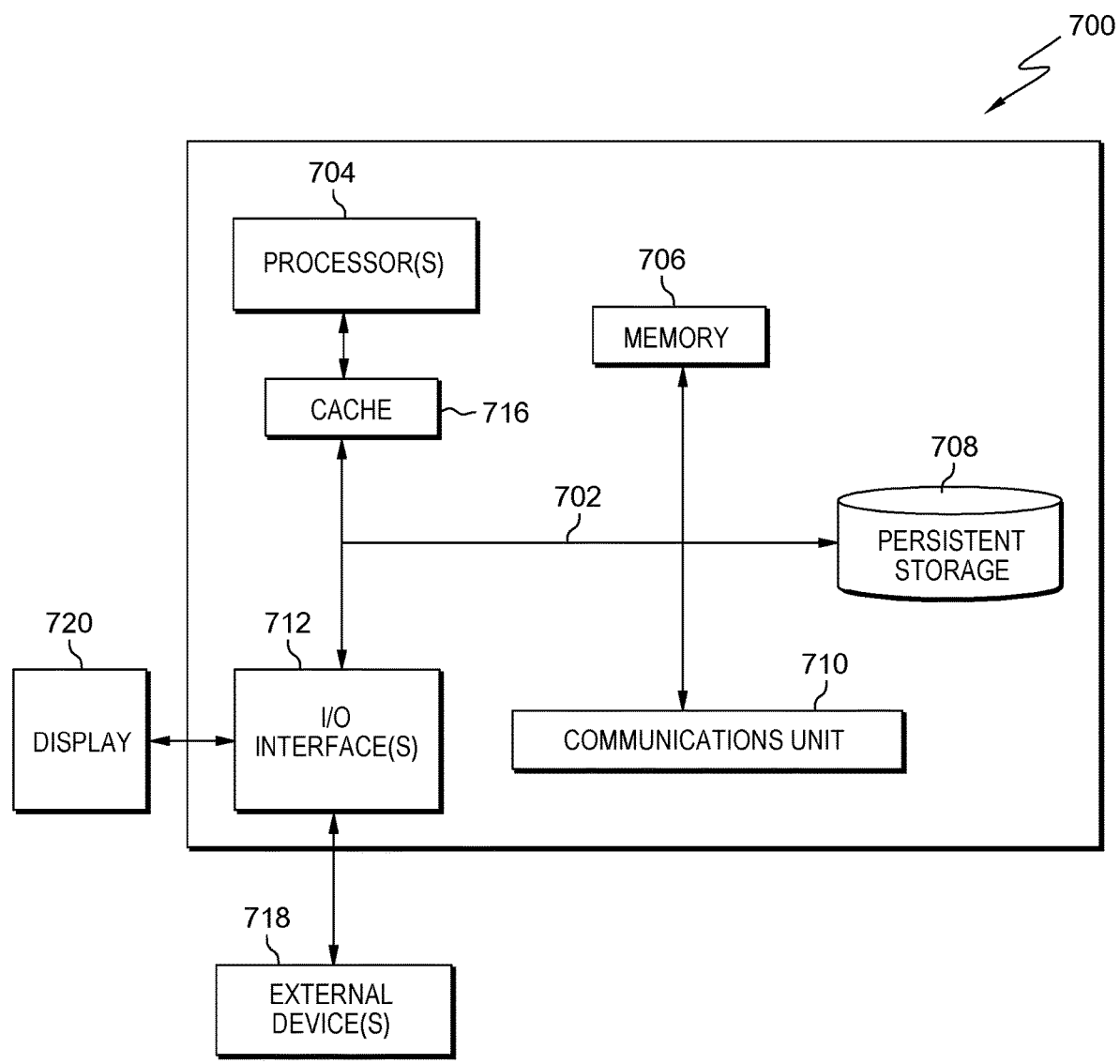
FIG. 7 is a block diagram of components included in the computing device of FIG. 1 executing the data collection program, in accordance with an embodiment of the present invention.

FIG. 7 depicts a block diagram 700 of components of computing device 102 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 102 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Data collection program 104 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Data collection program 104 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., data collection program 104, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    generating, by one or more processors, reference points based on a site map in a format as an input to data collection program and an accuracy requirement to achieve required levels of data survey accuracy for a site of interest;
    collecting, by one or more processors via a network, data at each reference point of the reference points through a data collecting agent of the data collection program;
    detecting, by one or more processors, an outlier at the reference points using a feedback from the data collecting agent during the data collection and a database that stores the collected data;
    eliminating, by one or more processors, the detected outlier and rectifying, by one or more processors, the data; and
    re-calibrating, by one or more processors, the reference points based on the rectified data and the feedback from the data collecting agent, wherein the re-calibrating of the reference points includes performing a re-survey of a problematic reference point and adaptively changing a minimum distance between the reference points, wherein the rectifying of the data includes identifying and rectifying, by one or more processors, an erroneous action of the data collecting agent by using data characteristics and the feedback from the data collecting agent.

2. The method of claim 1, further comprising validating, by one or more processors, the data after the data is collected from the reference points.

3. The method of claim 1, wherein detecting an outlier includes using a propagation model which is built with obstacle and location information.

4. The method of claim 1, wherein detecting an outlier includes using historical data from a machine learning model.

5. The method of claim 4, wherein the data is a Wi-Fi fingerprinting data.

6. A computer program product for an indoor survey data collection, the computer program product comprising:
    one or more computer readable storage media and program instructions stored on the one or more computer readable storage media, the program instructions comprising:
    program instructions to generate reference points based on a site map in a format as an input to data collection program and an accuracy requirement to achieve required levels of data survey accuracy for a site of interest;
    program instructions to collect, via a network, data at each reference point of the reference points through a data collecting agent of the data collection program;
    program instructions to detect an outlier at the reference points using a feedback from the data collecting agent during the data collection and a database that stores the collected data;
    program instructions to eliminate the detected outlier and rectify the data; and
    program instructions to re-calibrate the reference points based on the rectified data and the feedback from the data collecting agent, wherein the re-calibrating of the reference points comprises performing a re-survey of a problematic reference point and adaptively changing a minimum distance between the reference points, wherein the rectifying of the data includes identifying and rectifying an erroneous action of the data collecting agent by using data characteristics and the feedback from the data collecting agent.

7. The computer program product of claim 6, further comprising:
    program instructions, stored on the one or more computer readable storage media, to validate the data after the data is collected from the reference points.

8. The computer program product of claim 6, program instructions to detect an outlier comprise:
    program instructions to use historical data from a machine learning model based on a Wi-Fi fingerprinting process and nature of Wi-Fi signals.

9. A computer system for an indoor survey data collection, the computer system comprising:
    one or more computer processors, one or more computer readable storage media, and program instructions stored on the computer readable storage media for execution by at least one of the one or more computer processors, the program instructions comprising:
    program instructions to generate reference points based on a site map in a format as an input to data collection program and an accuracy requirement to achieve required levels of data survey accuracy for a site of interest;
    program instructions to collect, via a network, data at each reference point of the reference points through a data collecting agent of the data collection program;
    program instructions to detect an outlier at the reference points using a feedback from the data collecting agent during the data collection and a database that stores the collected data;
    program instructions to eliminate the detected outlier and rectify the data; and
    program instructions to re-calibrate the reference points based on the rectified data and the feedback from the data collecting agent, wherein the re-calibrating of the reference points comprises performing a re-survey of a problematic reference point and adaptively changing a minimum distance between the reference points, wherein the rectifying of the data includes identifying and rectifying an erroneous action of the data collecting agent by using data characteristics and the feedback from the data collecting agent.

10. The computer system of claim 9, further comprising:
    program instructions, stored on the one or more computer readable storage media, to validate the data after the data is collected from the reference points.

11. The computer system of claim 9, wherein program instructions to detect an outlier comprise:

program instructions, stored on the one or more computer readable storage media, to use historical data from a machine learning model based on a Wi-Fi fingerprinting process and nature of Wi-Fi signals.

* * * * *